US009360947B2

United States Patent
Liang et al.

(10) Patent No.: US 9,360,947 B2
(45) Date of Patent: Jun. 7, 2016

(54) INPUT DEVICE WITH SWING OPERATION

(75) Inventors: Chen-Yi Liang, New Taipei (TW);
Cheng-Hsiang Chuang, New Taipei (TW); Chun-Chien Chen, New Taipei (TR); Shun-De Bai, New Taipei (TW); San-Pao Kao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 516 days.

(21) Appl. No.: 13/343,714

(22) Filed: Jan. 5, 2012

(65) Prior Publication Data
US 2012/0211344 A1  Aug. 23, 2012

(30) Foreign Application Priority Data
Feb. 18, 2011  (TW) .............................. 100202996 U

(51) Int. Cl.
| | |
|---|---|
| H01H 13/70 | (2006.01) |
| G06F 3/02 | (2006.01) |
| H01H 21/24 | (2006.01) |
| H01H 13/705 | (2006.01) |
| H01H 23/12 | (2006.01) |

(52) U.S. Cl.
CPC ............ *G06F 3/0202* (2013.01); *G06F 3/0213* (2013.01); *H01H 13/705* (2013.01); *H01H 21/24* (2013.01); *H01H 23/12* (2013.01); *H01H 2221/016* (2013.01)

(58) Field of Classification Search
CPC ....... H01H 21/22; H01H 21/24; H01H 23/12; H01H 23/24; H01H 2221/016; H01H 13/705
USPC ......................................................... 200/534
See application file for complete search history.

(56) References Cited

U.S. PATENT DOCUMENTS

| 3,916,135 | A | * | 10/1975 | Holden et al. ................. 200/339 |
|---|---|---|---|---|
| 4,430,531 | A | * | 2/1984 | Wright ............... H01H 13/7006 200/275 |
| 5,117,075 | A | * | 5/1992 | Guilleminot .................. 200/343 |
| 6,563,061 | B2 | * | 5/2003 | Takahashi ..................... 200/5 A |
| 8,592,699 | B2 | * | 11/2013 | Kessler et al. ................ 200/5 A |
| 2004/0195082 | A1 | * | 10/2004 | Takeda et al. ................. 200/343 |
| 2012/0194417 | A1 | * | 8/2012 | Liang et al. .................... 345/156 |
| 2012/0211343 | A1 | * | 8/2012 | Liang et al. .................... 200/512 |

\* cited by examiner

*Primary Examiner* — Renee Leubke
*Assistant Examiner* — Lheiren Mae A Caroc
(74) *Attorney, Agent, or Firm* — Winston Hsu; Scott Margo

(57) ABSTRACT

An input device includes a printed circuit board for outputting a signal, a supporting base fixed on the printed circuit board, and a cap pivoted to the supporting base. A protrusion is formed on an end of the cap for contacting against the printed circuit board when the cap is not pressed down. The cap pivots relative to the supporting base when the cap is pressed down. The input device further includes a resilient conductive component disposed between the printed circuit board and the cap for being pressed by the cap to conduct the printed circuit board when the cap is pressed down.

8 Claims, 7 Drawing Sheets

INPUT DEVICE WITH SWING OPERATION

BACKGROUND OF THE INVENTION

1. Field of the Invention

The present invention relates to an input device, and more particularly, to an input device with swing operation for reducing total height thereof.

2. Description of the Prior Art

Generally, a conventional keyswitch of consumer electronic products utilizes a plurality of structural components with a resilient component to support a cap and rebound the cap. For example, it can utilize a scissors-type frame and a rubber dome for upright operation of the keyswitch to actuate a switch. However, upright operation needs more mechanical space for movement of the cap, so as to increase total height thereof. Besides, it has disadvantages of large amounts of components and complicated assembly. Thus, design of an input device capable of reducing occupied mechanical space and saving assembly cost is an important issue of the mechanical industry.

SUMMARY OF THE INVENTION

The present invention provides an input device with swing operation for reducing total height thereof for solving above drawbacks.

According to the claimed invention, an input device includes a printed circuit board for outputting a signal, a supporting base fixed on the printed circuit board, and a cap pivoted to the supporting base. A protrusion is formed on an end of the cap for contacting against the printed circuit board when the cap is not pressed down. The cap pivots relative to the supporting base when the cap is pressed down. The input device further includes a resilient conductive component disposed between the printed circuit board and the cap for being pressed by the cap to conduct the printed circuit board when the cap is pressed down.

According to the claimed invention, at least one opening is formed on the printed circuit board and located in a position corresponding to a pivot joint of the cap and the supporting base.

According to the claimed invention, the supporting base is fixed on the printed circuit board in a hot melt manner.

According to the claimed invention, a notch is formed on the supporting base and located in a position corresponding to the resilient conductive component.

According to the claimed invention, the printed circuit board contacts against the other end of the cap when the cap is pressed down.

According to the claimed invention, the input device further includes a flexible flat cable connected to the printed circuit board for transmitting the signal from the printed circuit board.

According to the claimed invention, the resilient conductive component is a rubber pillar, and a bottom of the resilient conductive component is made of conductive material.

According to the claimed invention, the input device is a keyswitch.

The input device of the present invention performs swing operation of the cap, instead of upright operation of conventional caps. The protrusion of the cap contacts against the printed circuit board when the cap is not pressed down, so as to keep the cap at a certain height. It can reduce the moving height of the cap so that there is no need to reserve more space for movement of the cap to save an internal mechanical space. Furthermore, the input device utilizes fewer components and has easy assembly, for reducing manufacturing and assembly cost.

These and other objectives of the present invention will no doubt become obvious to those of ordinary skill in the art after reading the following detailed description of the embodiment that is illustrated in the various figures and drawings.

DETAILED DESCRIPTION

Figure 1:
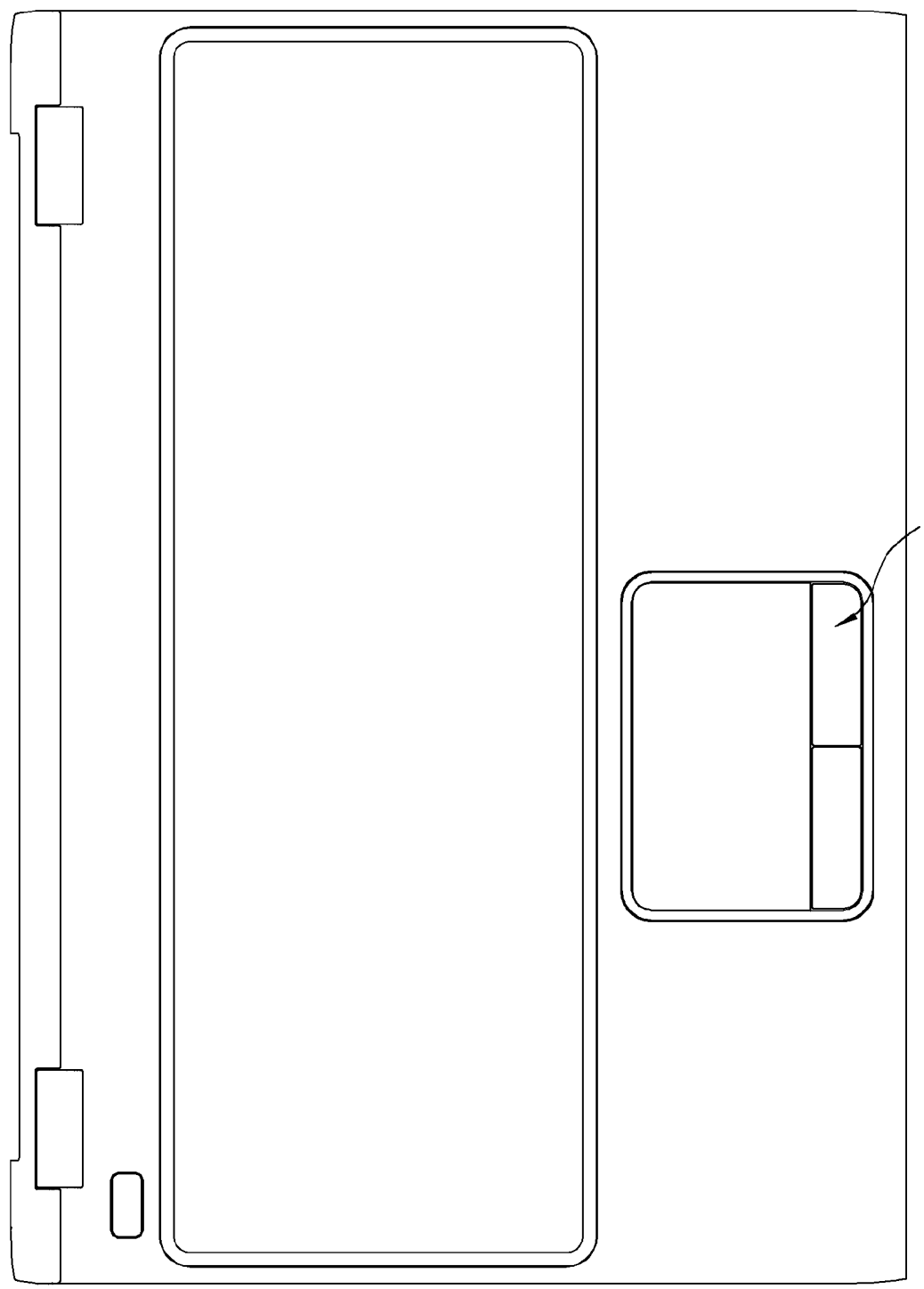
FIG. 1 is a schematic drawing of an input device according to an embodiment of the present invention.
Figure 2:
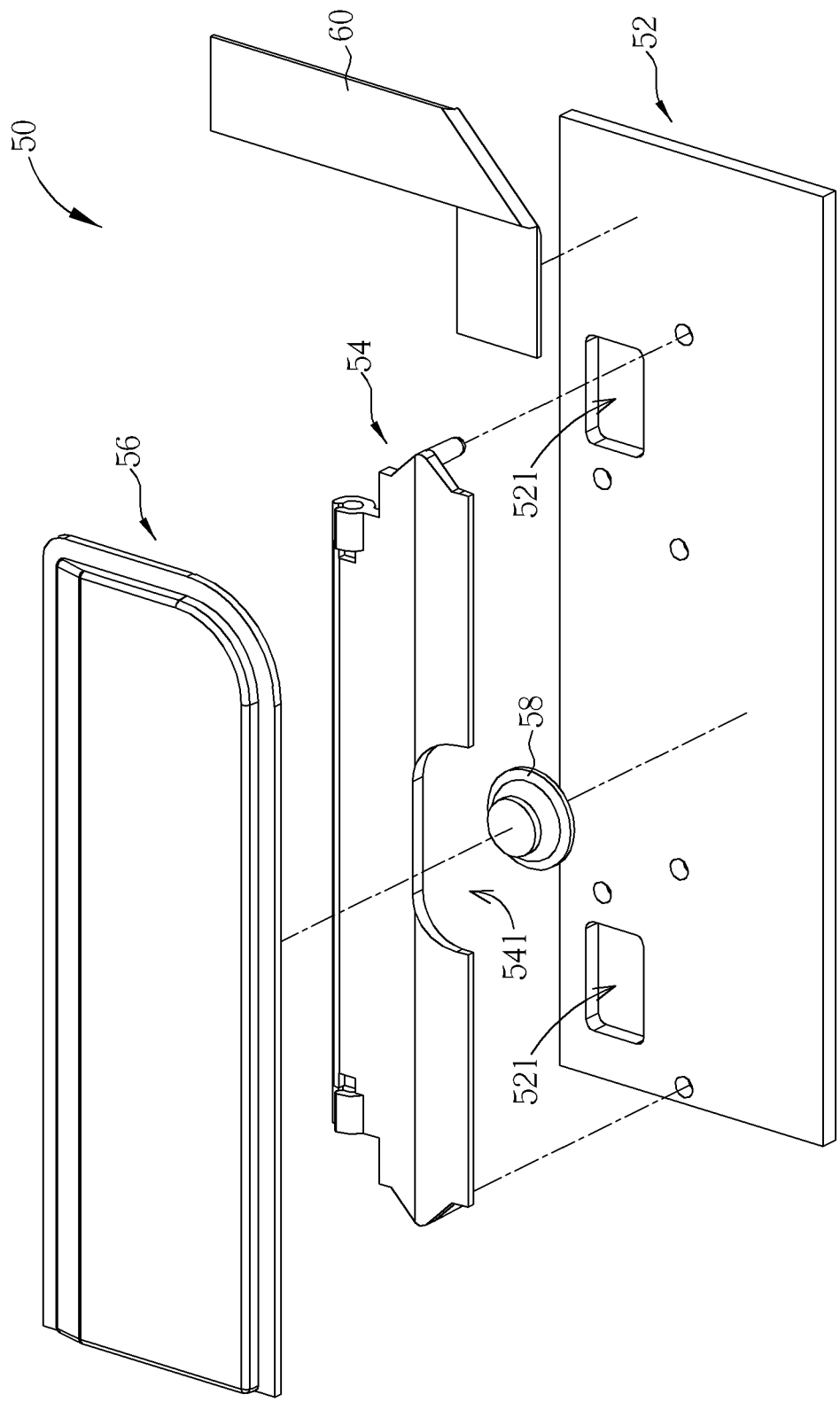
FIG. 2 and FIG. 3 are exploded diagrams of the input device in different views according to the embodiment of the present invention.
Figure 3:
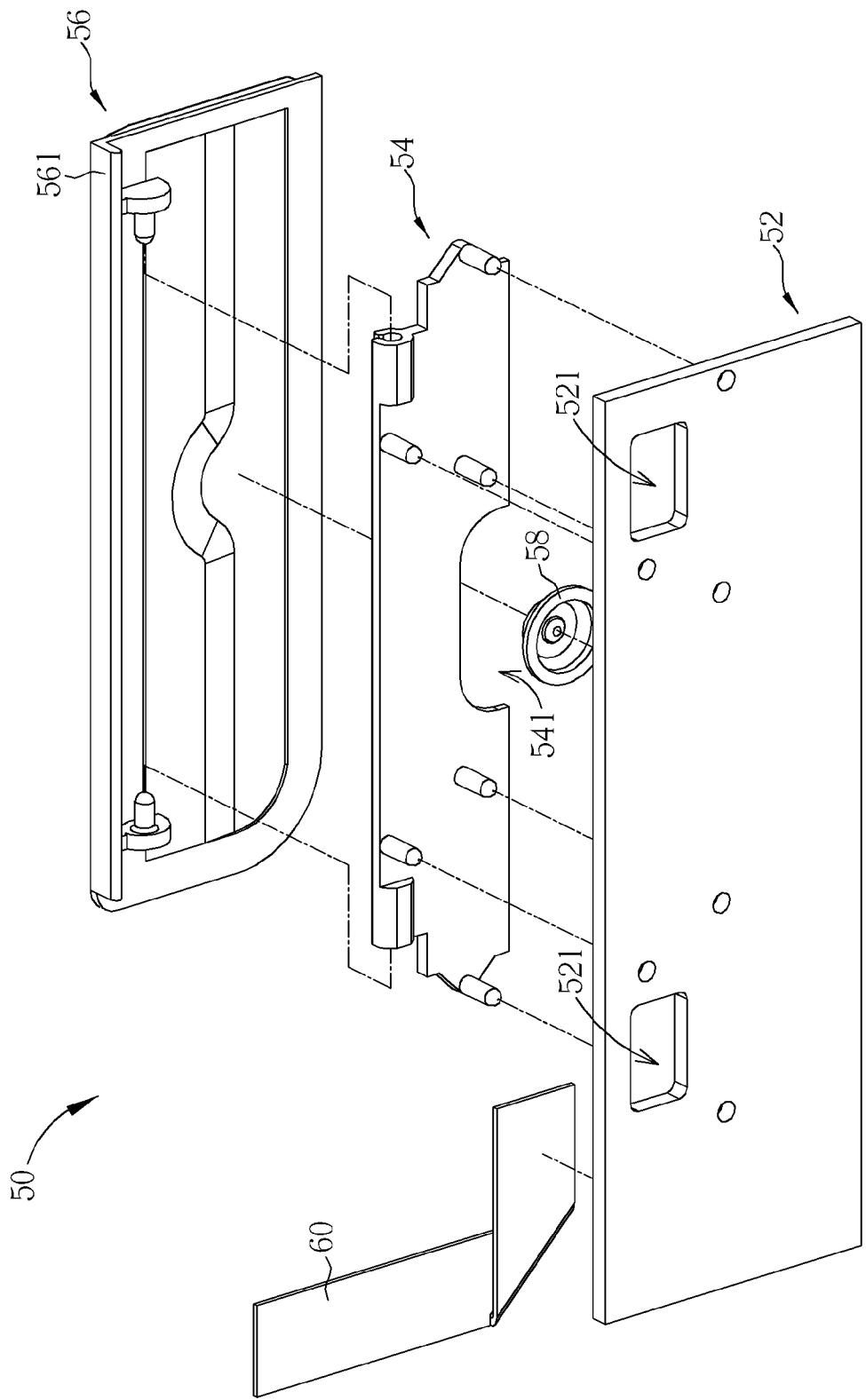

Please refer to FIG. 1 to FIG. 3. FIG. 1 is a schematic drawing of an input device 50 according to an embodiment of the present invention. FIG. 2 and FIG. 3 are exploded diagrams of the input device 50 in different views according to the embodiment of the present invention. The input device 50 can be a keyswitch, such as a keyswitch disposed below a touchpad of a notebook. The input device 50 includes a print circuit board 52 for outputting a signal. At least one opening 521 is formed on the print circuit board 52. The input device 50 further includes a supporting base 54 fixed on the printed circuit board 52. For example, the supporting base 54 can be fixed on the printed circuit board 52 in a hot-melt manner. A notch 541 is formed on the supporting base 54. The input device 50 further includes a cap 56 pivoted to the supporting base 54, such as combination of a positioning rod sheathed with a sheath. The supporting base 54 can constrain planar movement of the cap 56, so that the cap 56 can rotate precisely. The cap 56 can be an appearance structure of the input device 50, and a user can press the cap 56 to generate corresponding signals. A protrusion 561 is formed on an end of the cap 56, and the protrusion 561 can be a rib. The protrusion 561 contacts against the printed circuit board 52 when the cap 56 is not pressed down, and the protrusion 561 pivots relative to the supporting base 54 when the cap 56 is pressed down.

The input device 50 further includes a resilient conductive component 58 disposed between the printed circuit board 52 and the cap 56 and located in a position corresponding to the notch 541 of the supporting base 54, so as to prevent interference with the supporting base 54. The resilient conductive component 58 can be pressed by the cap 56 to conduct the printed circuit board 52 for generating corresponding signals when the cap 56 is pressed down by the user. The resilient conductive component 58 can be a rubber pillar, and a bottom of the resilient conductive component 58 can be made of conductive material. The resilient conductive component 58 can resiliently support the cap 56 and provide an operational feeling. The cap 56 presses the resilient conductive component 58 so as to resiliently deform the resilient conductive component 58 as the cap 56 is pressed down, and the bottom of the resilient conductive component 58 contacts a predetermined region of the printed circuit board 52 so as to conduct different contacts disposed on the printed circuit board 52. The resilient conductive component 58 resiliently recovers to its original position and provides a resilient force to the cap 56 for recovering the cap 56 back to an unpressed position as the cap 56 is released. In addition, the resilient conductive component 58 can be integrated with the cap 56 monolithically, and it depends on actual demand. In addition, the input device 50 further includes a flexible flat cable 60 connected to the printed circuit board 52 for transmitting the signal from the printed circuit board 52, such as a switch signal, to other circuit. It can save cost by using the printed circuit board 52 and the flexible flat cable 60 to transmit signals to other circuit.

Figure 4:
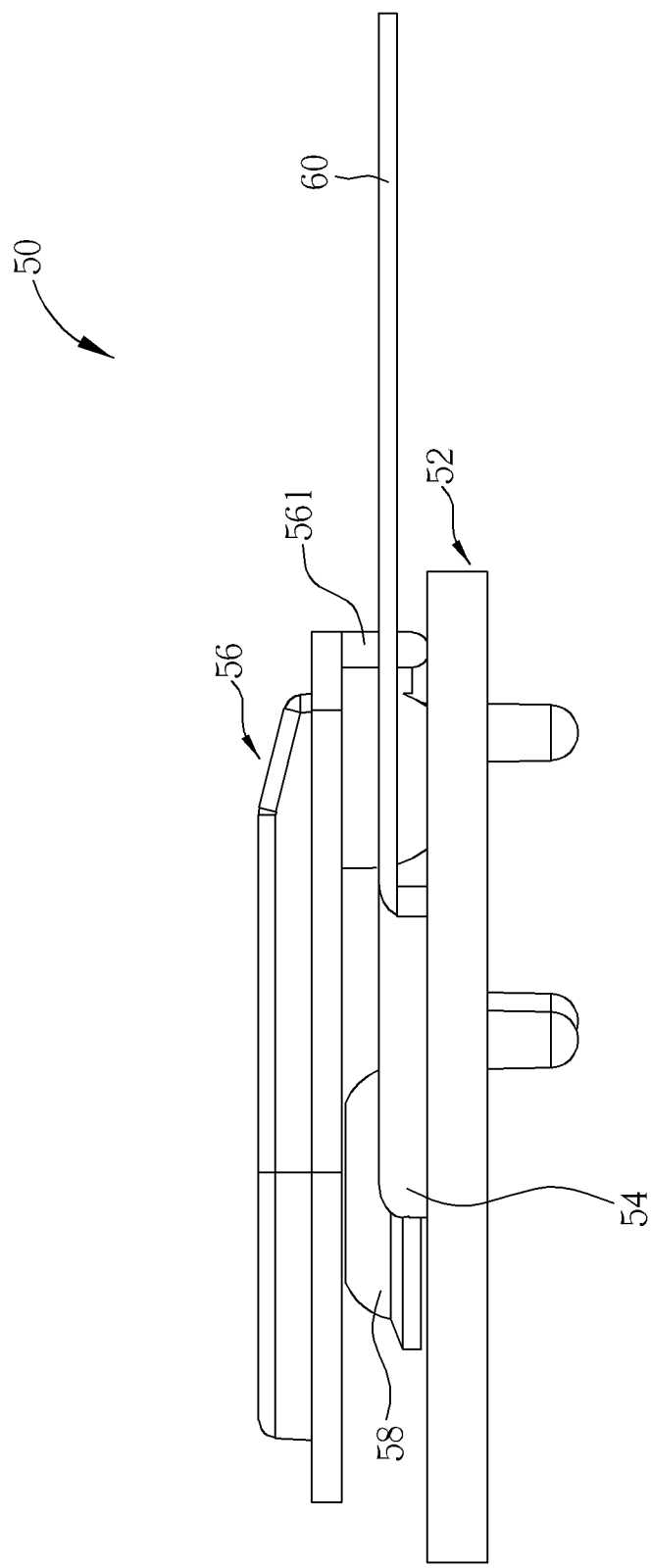
FIG. 4 and FIG. 5 are lateral diagrams respectively showing a cap being unpressed and pressed according to the embodiment of the present invention.
Figure 5:
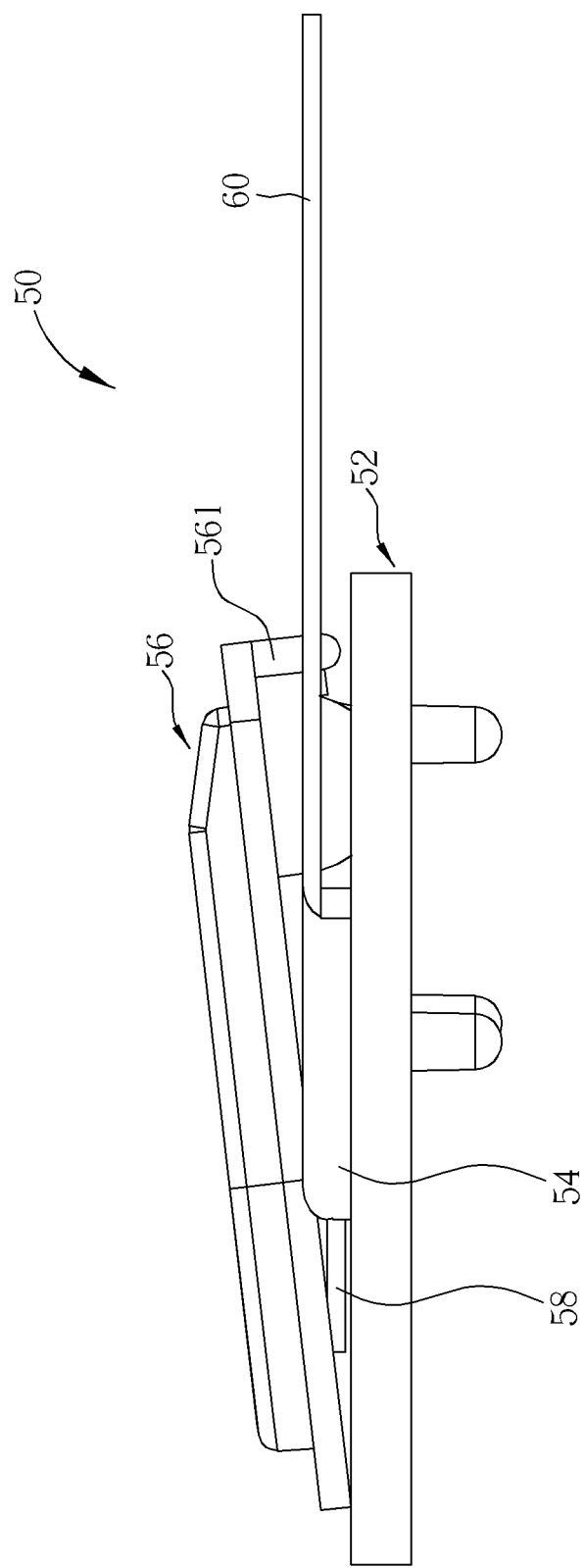
Figure 6:
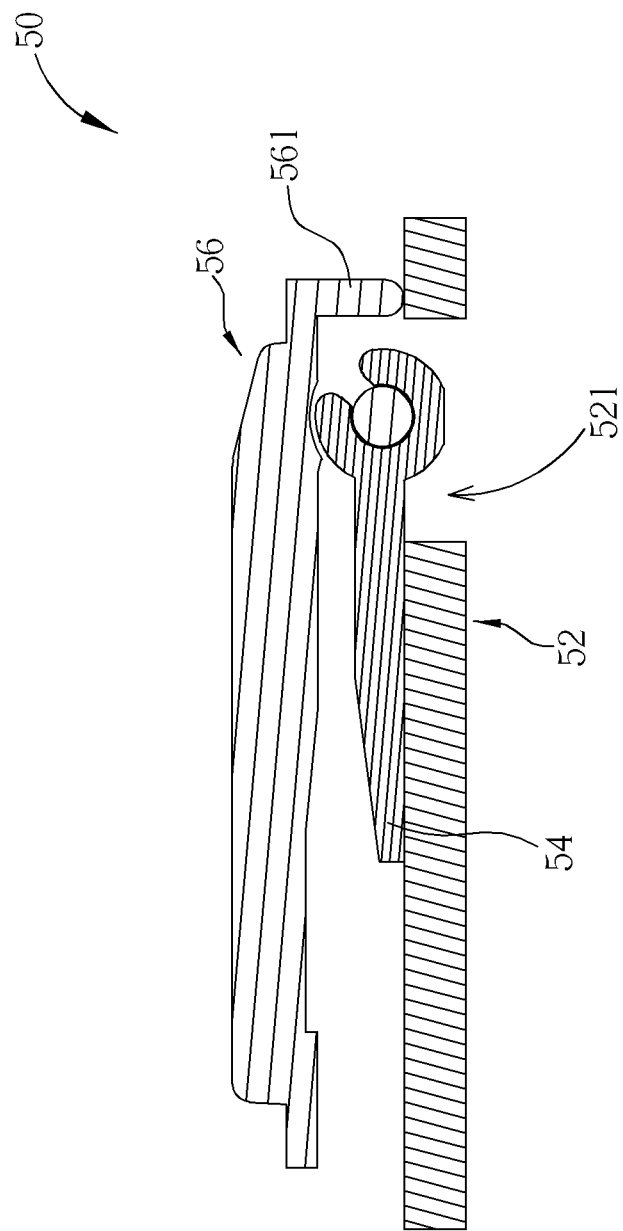
FIG. 6 and FIG. 7 are sectional diagrams respectively showing the cap being unpressed and pressed according to the embodiment of the present invention.
Figure 7:
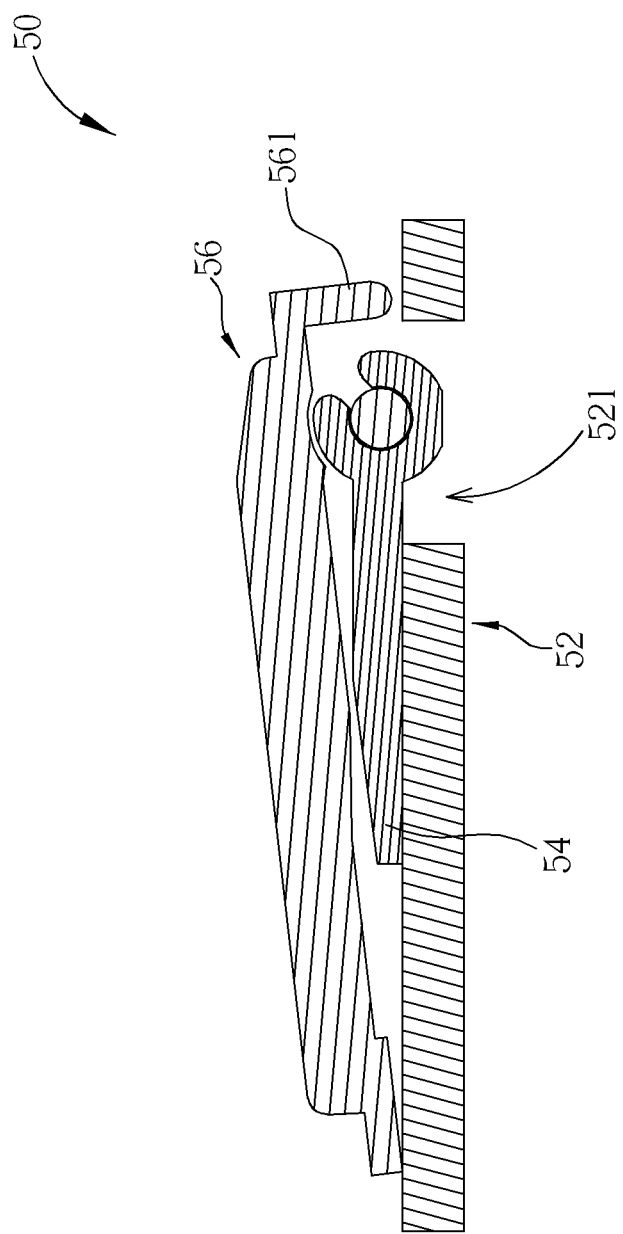

Please refer to FIG. 1 to FIG. 7. FIG. 4 and FIG. 5 are lateral diagrams respectively showing the cap 56 being unpressed and pressed according to the embodiment of the present invention. FIG. 6 and FIG. 7 are sectional diagrams respectively showing the cap 56 being unpressed and pressed according to the embodiment of the present invention. The protrusion 561 of the cap 56 contacts against the printed circuit board 52 when the cap 56 is not pressed down by the user, so that the cap 56 and the printed circuit board 52 are substantially parallel to each other and the cap 56 can be kept at a certain height. The cap 56 pivots relative to the supporting base 54 when the cap 56 is pressed down by the user, until the printed circuit board 52 contacts against the other end of the cap 56. In summary, the present invention provides swing operation of the cap 56, instead of upright operation of conventional caps. Because the openings 521 of the printed circuit board 52 are respectively located in positions corresponding to pivot joints of the cap 56 and the supporting base 54, the cap 56 can pivot relative to the supporting base 54 without interference with the printed circuit board 52.

Comparing to the prior art, the input device of the present invention performs swing operation of the cap, instead of upright operation of conventional caps. The protrusion of the cap contacts against the printed circuit board when the cap is not pressed down, so as to keep the cap at a certain height. It can reduce the moving height of the cap so that there is no need to reserve more space for movement of the cap to save an internal mechanical space. Furthermore, the input device utilizes fewer components and has easy assembly, for reducing manufacturing and assembly cost.

Those skilled in the art will readily observe that numerous modifications and alterations of the device and method may be made while retaining the teachings of the invention.

What is claimed is:

1. An input device comprising:
   a printed circuit board for outputting a signal;
   a supporting base fixed on the printed circuit board;
   a cap directly pivotally connected with the supporting base, a protrusion being formed on an end of the cap and located in a position different from a pivot joint between the cap and the supporting base for contacting against the printed circuit board when the cap is not pressed down, the protrusion being separate from the printed circuit board when the cap is pressed down, and the cap pivoting relative to the supporting base when the cap is pressed down; and
   a resilient conductive component disposed between the printed circuit board and the cap for being pressed by the cap to conduct the printed circuit board when the cap is pressed down.

2. The input device of claim 1, wherein at least one opening is formed on the printed circuit board and located in a position corresponding to a pivot joint of the cap and the supporting base.

3. The input device of claim 1, wherein the supporting base is fixed on the printed circuit board in a hot melt manner.

4. The input device of claim 1, wherein a notch is formed on the supporting base and located in a position corresponding to the resilient conductive component.

5. The input device of claim 1, further comprising a flexible flat cable connected to the printed circuit board for transmitting the signal from the printed circuit board.

6. The input device of claim 1, wherein the resilient conductive component is a rubber pillar, and a bottom of the resilient conductive component is made of conductive material.

7. The input device of claim 1, being a keyswitch.

8. The input device of claim 1, wherein the printed circuit board contacts against the other end of the cap when the cap is pressed down.

* * * * *

UNITED STATES PATENT AND TRADEMARK OFFICE
CERTIFICATE OF CORRECTION

PATENT NO. : 9,360,947 B2  
APPLICATION NO. : 13/343714  
DATED : June 7, 2016  
INVENTOR(S) : Chen-Yi Liang et al.

Page 1 of 1

It is certified that error appears in the above-identified patent and that said Letters Patent is hereby corrected as shown below:

On the title page, item (75), correct the citizenship of the third inventor from "New Taipei (TR)" to --New Taipei (TW)--.

Signed and Sealed this
Ninth Day of August, 2016

Michelle K. Lee
*Director of the United States Patent and Trademark Office*